United States Patent [19]

Ray

[11] Patent Number: 5,701,750

[45] Date of Patent: Dec. 30, 1997

[54] ZONE DEMAND CONTROLLED DUAL HEAT PUMP SYSTEM AND CONTROLLER THEREFOR

[76] Inventor: Robert W. Ray, 5801 Lumberdale Rd., #207, Houston, Tex. 77092

[21] Appl. No.: 494,688

[22] Filed: Jun. 26, 1995

[51] Int. Cl.$^6$ .................................................. F25B 13/00
[52] U.S. Cl. .......................... 62/160; 62/175; 236/1 EA; 236/1 B; 165/217
[58] Field of Search ..................... 62/160, 186, 180, 62/179, 510, 175; 236/1 E, 1 EA, 1 C, 1 B, 49.3; 165/212, 213, 214, 217

[56] References Cited

U.S. PATENT DOCUMENTS

| | | |
|---|---|---|
| 4,259,847 | 4/1981 | Pearse, Jr. ............... 236/1 EA X |
| 4,501,125 | 2/1985 | Han .............................. 62/175 |
| 4,830,274 | 5/1989 | Johnson et al. ............. 236/1 B |
| 5,181,653 | 1/1993 | Foster et al. ............. 236/1 B X |

Primary Examiner—Harry B. Tanner
Attorney, Agent, or Firm—Bush, Riddle & Jackson, LLP

[57] ABSTRACT

A thermal zone demand controlled dual cascade arranged heat pump system and system controller for building spaces, having first and second heat pumps and having an air circulation system for circulating air to and from said thermal zones and including a conditioned air chamber having first and second heat exchange refrigerant coils being connected in refrigerant circulating relation respectively with the heat pumps. A plurality of thermal zone blowers conduct conditioned air, heated or cooled, from the conditioned air chamber to respective thermal zones of the building space. Electronic controller circuitry of the system is coupled for thermal demand control of the heat pumps and the thermal zone blowers for operation of the first heat pump to accommodate a predetermined range of thermal load and for operation of the second heat pump along with the first heat pump to accommodate a greater thermal load. The controller circuitry also controls selective operation of the thermal zone blowers as well as operation of the thermal zone blowers at low blower speed or high blower speed responsive to sensed conditions of thermal load. The electronic controller circuitry further provides for selective reversal of dual heat pump operation to compensate for unequal operational wear of the heat pump units.

14 Claims, 6 Drawing Sheets

ZONE DEMAND CONTROLLED DUAL HEAT PUMP SYSTEM AND CONTROLLER THEREFOR

FIELD OF THE INVENTION

This invention relates generally to heat pump systems which are employed for both heating and cooling of rooms within domestic dwellings and commercial buildings. More specifically, the present invention concerns a zone demand controlled multiple blower dual heat pump system and its electronic control system which employs small capacity heat pump systems installed in cascaded or tandem array for independent heat pump operation during conditions of low heat load and simultaneous heat pump operation during periods of high heat load. Even more specifically, the present invention concerns dual heat pumps one designated for primary operation under conditions of low heat load and one designated as a secondary heat pump for operation along with the primary heat pump under conditions of high load, together with control circuitry for selectively designating either of the two heat pumps as primary and secondary cascaded heat pumps.

BACKGROUND OF THE INVENTION

The inside spaces of building structures such as domestic dwellings and commercial buildings have in the past been cooled by a conventional air conditioning system having a condenser externally of the building structure incorporating refrigerant heat exchange coils and a heat exchange blower and having a compressor for achieving pressurized circulation of refrigerant such as freon. The typical air conditioning system also incorporates an evaporator system located internally of the building, within an air flow conduit system and having a refrigerant coil for heat exchange and a blower for circulating air through the conduit system to and from the inside space of the building structure. Typically the condenser system will also incorporate a condensed moisture collection and discharge system. Typically, for the purpose of heating conventional building structures are provided with separate heat exchange systems which may employ electric or gas fired heating. Typically the blower of the condenser of the air conditioning system will also serve as the blower for circulating heat from the heat exchange apparatus of the heating system. The air conditioning system or the heating system may be manually selected or, as is typically the case, may be automatically selected by control circuitry having a thermostat for its sensing and control.

For a significant period of time alternative heating and cooling systems have been developed, typically referred to as heat pumps, which are typically electrically energized but may be energized by other means as well. A heat pump differs from conventional air conditioning systems only in the heat cycle. In the cool cycle the heat pump system incorporates an external condenser and internal evaporator each having heat exchange coils and blowers. In the cooling cycle the condenser unit circulates air across heat exchange coil through which refrigerant is circulated. The refrigerant gas absorbs the heat and the resulting cool air is circulated through an air supply and return conduit system that circulates the conditioned air to internal zones or spaces within the building structure. Simultaneously air that becomes heated by virtue of its presence within the zones of the building structure is circulated back through the coils for reheating. The heat absorbed refrigerant is then circulated to the coils of the condenser located externally of the building structure and is liberated by the heat exchanger of the condenser into the external environment.

The heating cycle of the heat pump simply reverses the cycle. The heat is absorbed from the outside coils of the condenser and is exchanged via the coils of the internal evaporator so that heated air is circulated into the spaces of the building structure via the air circulation conduit system. Thus, the heat pump is a single air conditioning system that functions for both cooling and heating of the building structure, typically in response to thermostatic control.

It is typical for air conditioning and heat pump systems to be designed for peak load conditions and to employ a single air conditioning or heat pump unit that is of sufficient cooling capacity to accommodate the maximum peak load that will be experienced at any particular point in time. For this reason, air conditioning and heat pump systems will typically operate continuously under peak heat load conditions but at other times will cycle on and off as determined by thermostatic control. Maximum electric energy utilization occurs when the units are undergoing start up and initial refrigerant compression. Consequently, when a large unit cycles many times during each 24 hour period electrical energy utilization can be quite high. It is desirable therefore to provide a heat pump system having the capability of accommodating a wide range of heating conditions and yet functioning at nominal electrical energy utilization. It is also desirable to provide a heat pump system having the capability of substantially continuous operation of at least one heat pump unit to thereby minimize start up cycling and thus provide for lower electrical energy requirements for handling a wide range of heat load.

SUMMARY OF THE INVENTION it is therefore a principal feature of the present invention to provide a novel heat pump system for domestic dwellings and commercial building incorporating dual heat pump units one which operates substantially continuously to accommodate normal heat load while the second unit operates intermittently to accommodate conditions of high heat load.

It is another feature of this invention to provide a novel dual heat pump system wherein one heat pump is designated primary for substantially continuous operation under average heat load conditions and second heat pump being designated secondary for simultaneous operation along with the primary heat pump under conditions of high heat load.

It is also a feature of this invention to provide a novel dual heat pump system wherein primary and secondary heat pumps are employed in tandem or cascade relation with one heat pump being primary and the other heat pump being secondary and with control switching means for reversing the primary and secondary operational designations of the dual heat pump units.

It is also a feature of the present invention to provide a novel dual cascade heat pump installing incorporating a condenser unit located internally of the building structure and having heat transfer coils connected respectively to first and second heat pump condensers located externally of the building structure and with the evaporator being provided with an independently controlled supply blower for each of multiple zones within the building structure, with each zone having an independent thermostat for blower controlled air supply thereto.

Briefly, the various objects and features of the present invention are effectively realized through a provision of a dual heat pump system that is electronically interconnected for cascade operation and is provided with independent thermostatically controlled blowers for each of a multiple of zones that are designated within the building structure. A pair of heat pumps are provided each of which is capable of accommodating average heat load conditions so that one of the heat pumps is operational under average heat load conditions while the other heat pump is deenergized. When heat load to the building structure reaches its peak conditions the second heat pump will become energized so that the two heat pumps functioning together will effectively accommodate the peak heat load. Thus, the first heat pump operates during most of each day to accommodate nominal heat load conditions and the second heat pump operates only during limited periods of heat load. The first heat pump will seldom cycle on and off during each day thereby maintaining its electrical energy utilization at a nominal level since the high energy needs for cycling seldom occur. The second heat pump unit operates only under peak load conditions and thus it also cycles infrequently so that its electrical energy utilization is also at a nominal level. The first and second heat pumps are operated via an electrical control system incorporating a switch for reversing the primary and secondary heat pump designations so that the primary heat pump becomes the secondary heat pump and visa versa to thereby maintain optimum service life of both heat pumps.

Within the building structure there are designated heat zones which are each provided with a conditioned air supply provided by an independent air supply blower for each zone. Each of the heat zones is also provided with a thermostat so that the air supply blower for that particular zone will operate only when the heat load within that zone is above the minimum setting of the thermostat. Both of the coils of the primary and secondary heat pumps are positioned in tandem so that return air being drawn into the system by the return air blower will be forced across both of the coils to thus provide for heat exchange from the refrigerant passing through either or both of the coils. The multiple air supply blowers of the respective heat zones of the building structure each have their inlet or suction side in communication with a conditioned air chamber or manifold so that cooled or heated air as the case may be is immediately available to each of the air supply blowers so that the conditioned air can be directed immediately to the thermal zone of necessity.

Each of the heat pump systems is provided with low and high levels of heat pump operation and each is capable of operating so as to supply heated or cooled air to the air supply manifold depending upon the thermal conditions that are sensed by the respective thermostats.

BRIEF DESCRIPTION OF THE DRAWINGS

The various objects and advantages of this invention will become apparent to those skilled in the art upon an understanding of the following detailed description of the invention, read in light of the accompanying drawings which are made a part of this specification and in which.

DETAILED DESCRIPTION OF PREFERRED EMBODIMENT

Figure 1:
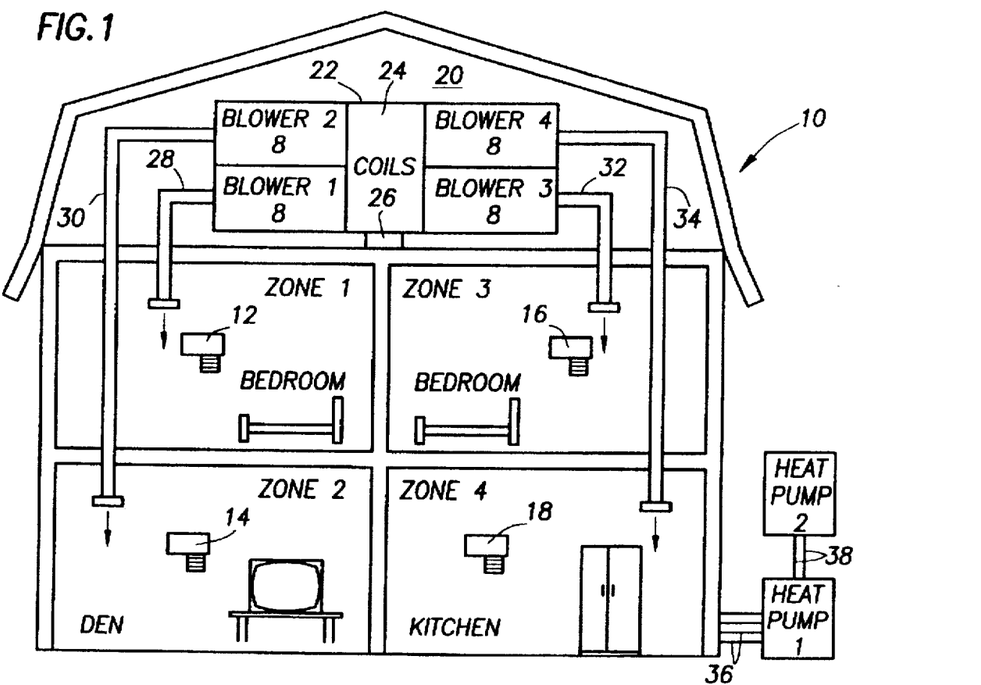
FIG. 1 is a schematic illustration in elevation showing a building structure having four thermal zones and having a dual, cascade installed heat pump system constructed in accordance with the present invention installed therein and being controlled by thermostats for each of the thermal zones.

Referring now to the drawings and first to FIG. 1 a building structure which may be a domestic dwelling or a commercial building is shown generally at 10 and is generally in the form of a two story structure which is partitioned into thermal zones 1, 2, 3, and 4, each thermal zone being provided with an individual thermostat as shown at 12, 14, 16 and 18. The building structure defines a space 20 which, in the case of a domestic dwelling would typically be designated the attic, a space that is not typically cooled or heated by the heat pump system. Within the attic space 20 is provided an evaporator unit 22 of a dual, cascaded heat pump installation at which defines a closed chamber 24 having a pair of evaporator coils located therein so that air from a return conduit 26 is caused to flow across both of the heat exchange coils as will be more clearly evident in connection with FIG. 2. The evaporator unit 22 is provided with a plurality of air supply blowers, identified in the drawings as blowers 1–4 with respective discharge conduits 28, 30, 32 and 34 each being in communication with a respective one of the heat zones of the building structure. The dual, cascaded heat pump system is provided with electronic control circuitry which is discussed in detail herein below which causes each of the air supply blowers 1–4 to be operated independently according to demand as controlled by the respective thermostats.

Externally of the building structure 10 there is provided a pair of heat pumps identified as heat pumps 1 and 2. The refrigerant supply and return lines 36, typically copper conduits are interconnected with the respective heat exchange coil of manifold chamber 24 for that particular pump. Likewise, the refrigerant supply and return lines 38 for heat pump 2 are coupled with the heat exchange coil for that particular heat pump within the manifold chamber 24.

As shown in further detail in FIG. 1 a generally rectangular enclosure 40 is provided which defines the air supply manifold chamber 24 the zone air supply blowers 1–4 are physically supported by respective wall structures 42 and 44 of the housing 40. Typically these air supply blowers are squirrel cage type blowers but it is not intended that the blowers be restricted to any particular type.

Figure 2:
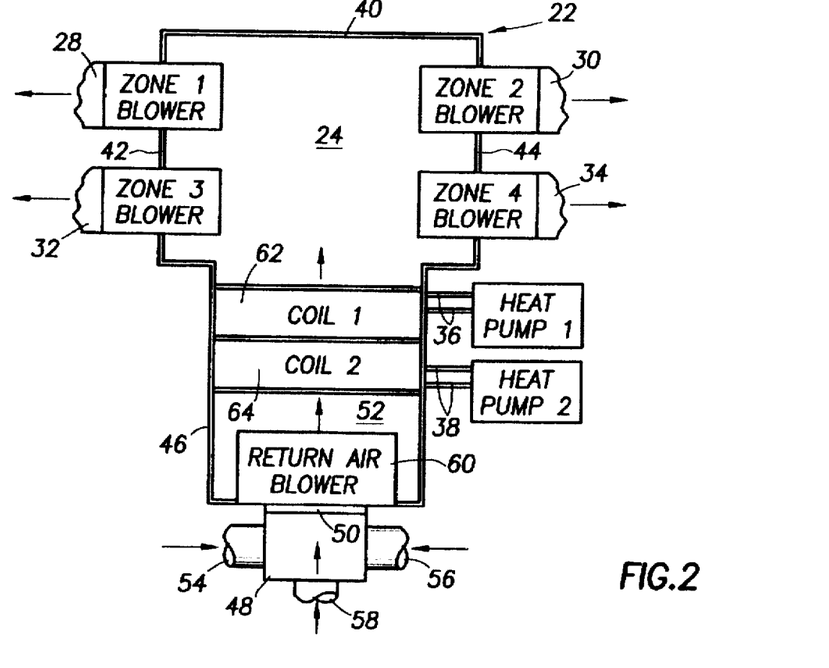
FIG. 2 is a plan view of an evaporator unit of the dual heat pump system, showing the typical installation for the building structure of FIG. 1.

The housing structure of the condenser unit 22 also incorporates an air return housing 46 to which is connected an air return plenum 48 having an air filter 50 for separating dust and other debris from the air being circulated through the air conditioning system. The air return plenum 48 may be the sole source of air return to the air return chamber 52 or, as shown in FIG. 2 a plurality of air return conduits may be provided as shown at 54, 56 and 58 for conducting return air into the plenum 48. Within the air return chamber 52 is provided an air return blower 60 having its suction side in communication with the air return plenum 48. Also located within the air return chamber 52 are a pair of heat exchange coils 62 and 64 representing the heat exchange coils for the heat pumps 1 and 2. These heat exchange coils are arranged so that all of the return air discharged from the return air blower 60 will pass through both heat exchange coils so that heat from the return air will be partially absorbed by the heat exchange coil or coils through which refrigerant is circulating at any given time. For example, if heat pump 1 is the primary heat pump and is operating while the secondary heat pump is deenergized, refrigerant will be flowing only through heat exchange coil 1 so that the heat of the return air is absorbed only by the refrigerant flowing through the heat exchange coil 62. Under conditions of high heat load the second or secondary heat pump 2 will also be operating thereby causing refrigerant to circulate through both of the heat exchange coils 62 and 64. In this case the heat absorbing characteristics of the system will be enhanced by the additional heat exchange capacity of the coils functioning in tandem. The return air blower 60 will typically have multiple blower speeds so that the velocity of return air flowing through the heat exchange coils can be varied according to the demands of the various zones of the building structure.

The return air, after having passed through the heat exchange coils 62 and 64 will be present in the conditioned air distribution chamber 24 so that it is immediately available to the suction side of each of the zone blowers 1–4. If only one of the zones of the building structure is in need of additional cooling or heating to maintain its predetermined temperature range the blower for that particular zone will be energized as determined by the thermostat of that particular zone. For example, as is typically the case in a domestic dwelling, during preparation of meals zone 4, being the kitchen of the building may experience significant heat input as the result of stoves for cooking, dishwasher operation, refrigerator operation, etc. When the heat input to zone 4 increases to a predetermined level the thermostat 18 will activate the blower for zone 4, thereby directing air from the conditioned air chamber 24 via conduit 34 into that particular zone. If at this time zones 1–3 are within their respective preset temperature ranges the blowers for these zones will be deenergized and conditioned air will be supplied only to zone 4. The blowers for the remaining zones of the building structure will be activated only when their respective temperature range increases or decreases to a level outside the preset temperature range as determined by the thermostat for that particular zone.

Figure 3A:
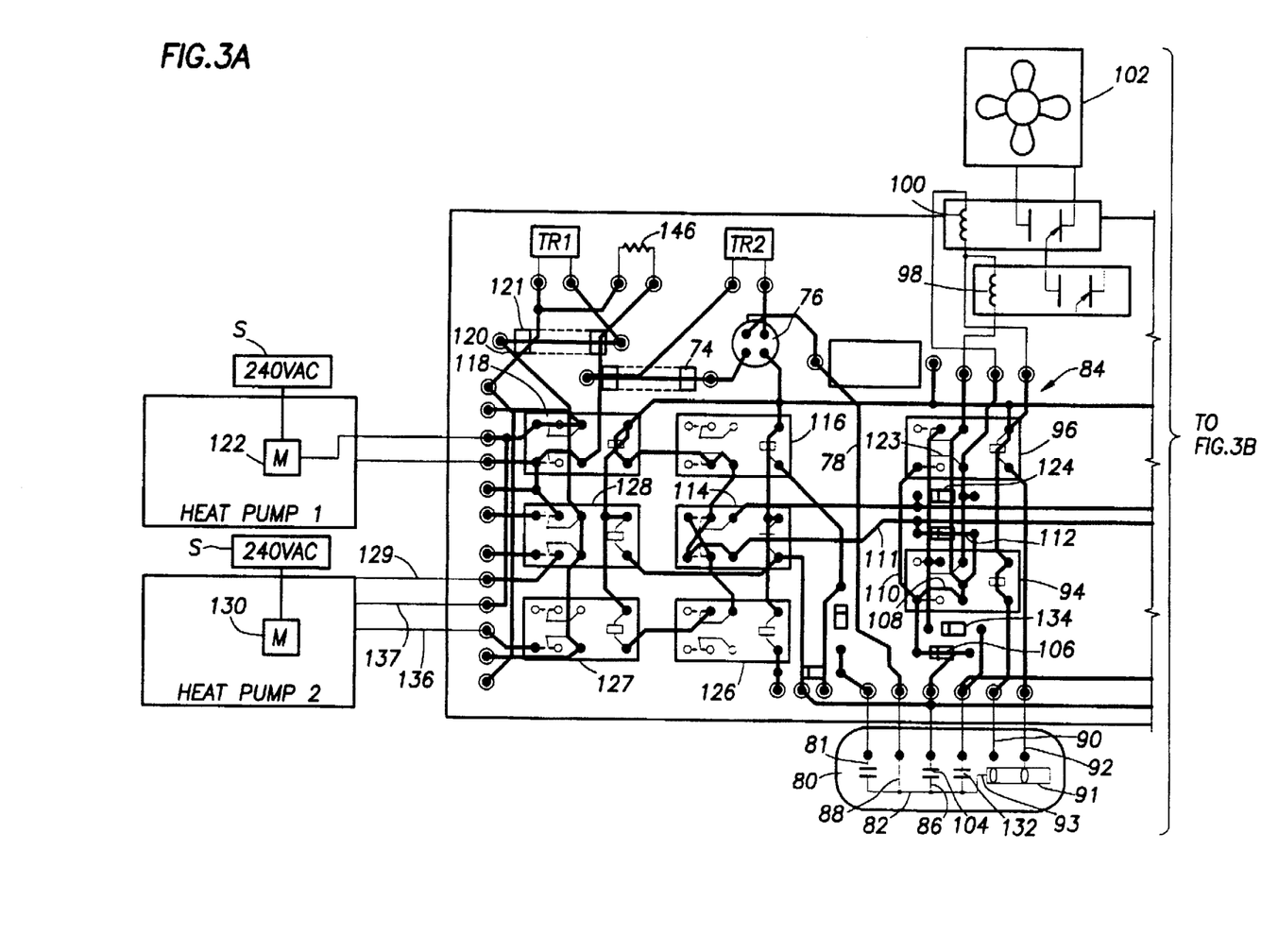
FIG. 3 is a schematic circuit board illustration of electronic circuitry for four thermal zone installation of the cascade heat pump system of FIGS. 1 and 2 and with the circuitry operating in the "cool" mode and for the purpose of simplicity showing a single thermostat for controlling the temperature of one of the thermal zones.
Figure 3B:
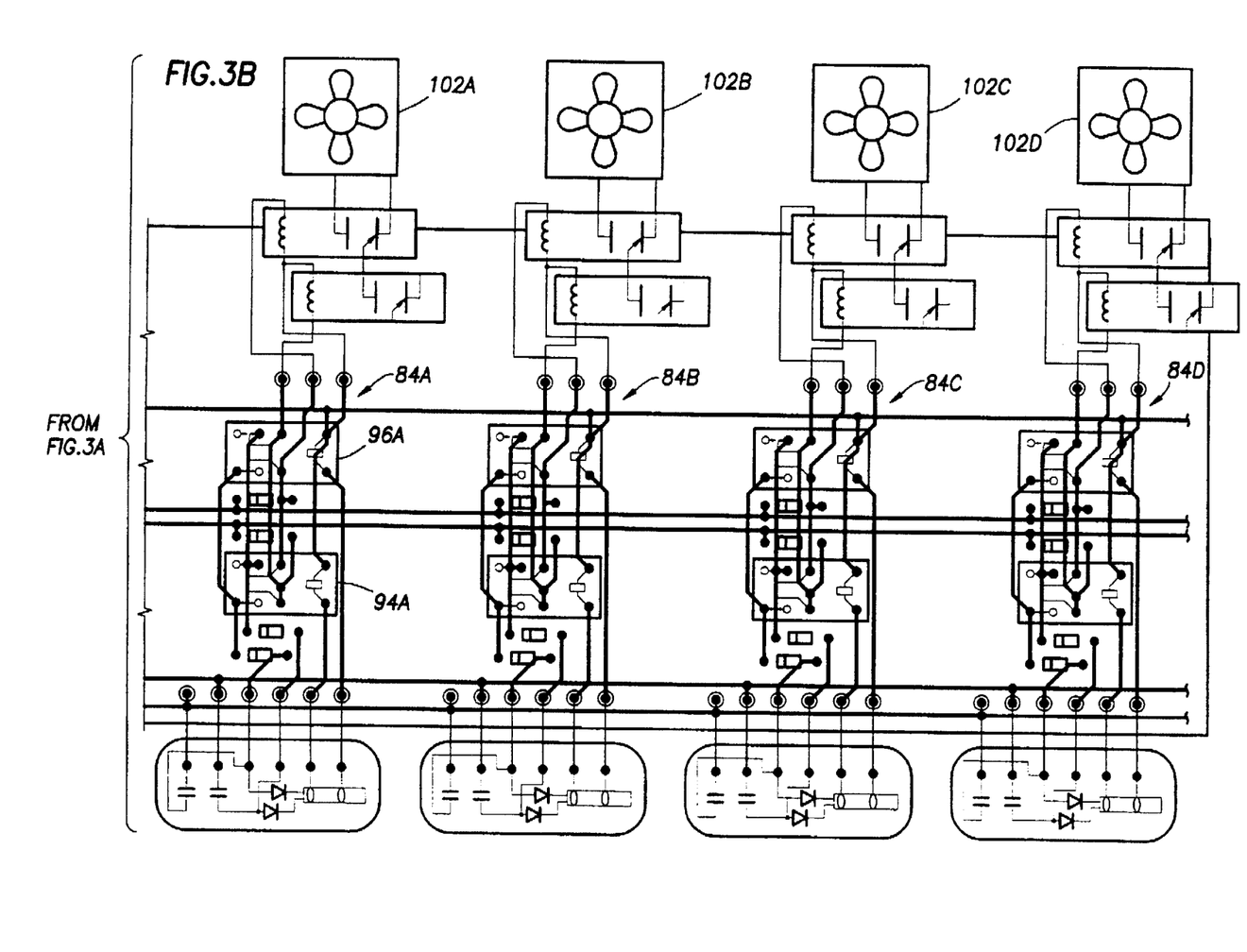
Figure 4A:
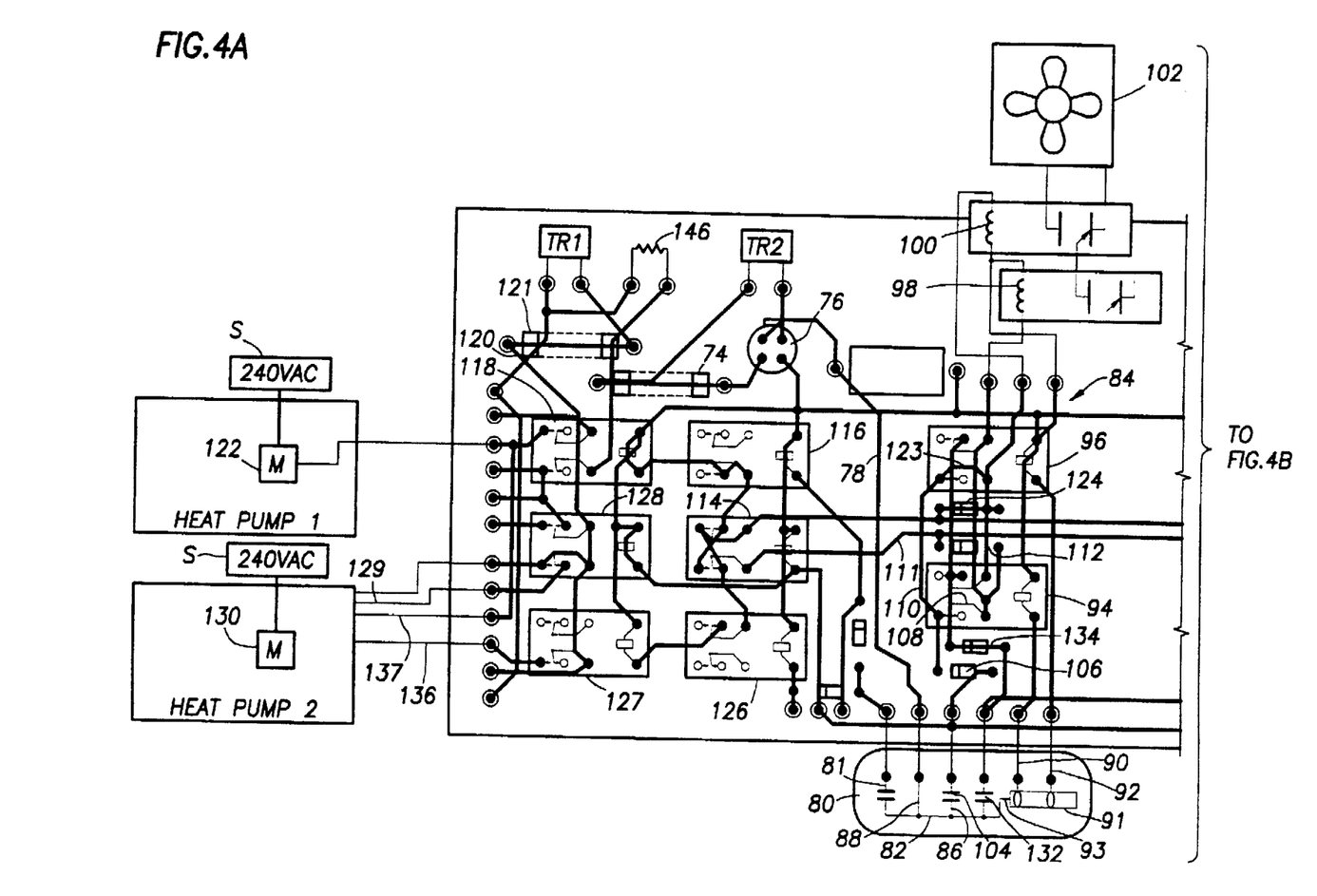
FIG. 4 is a schematic circuit board illustration of electronic circuitry for four thermal zone installation of the cascade heat pump system similar to the schematic illustration of FIG. 3 and with the circuitry controlling operation of the cascade heat pump system in the "heat" mode and for the purpose of simplicity showing a single thermostat for controlling the temperature of one of the thermal zones.
Figure 4B:
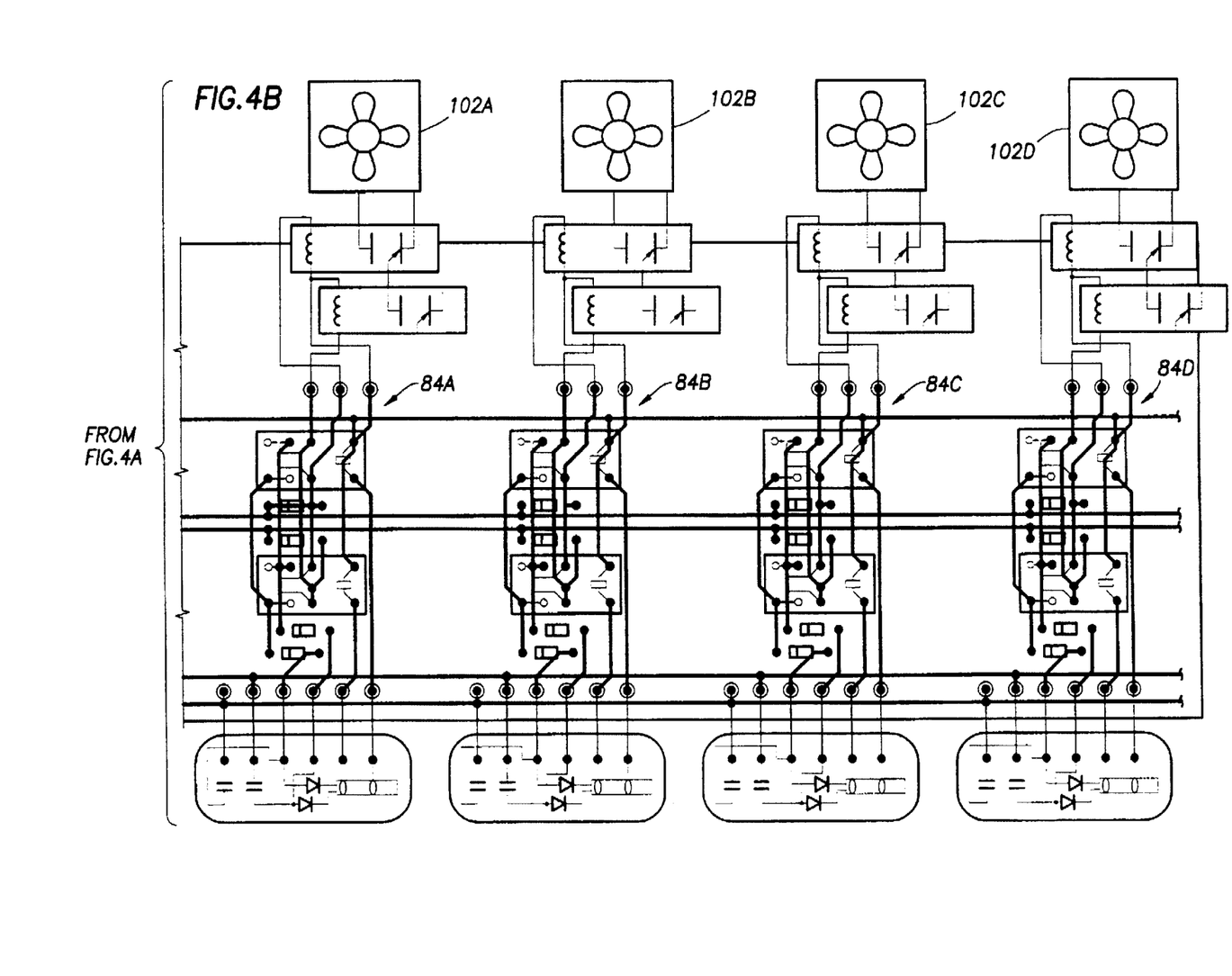
Figure 5:
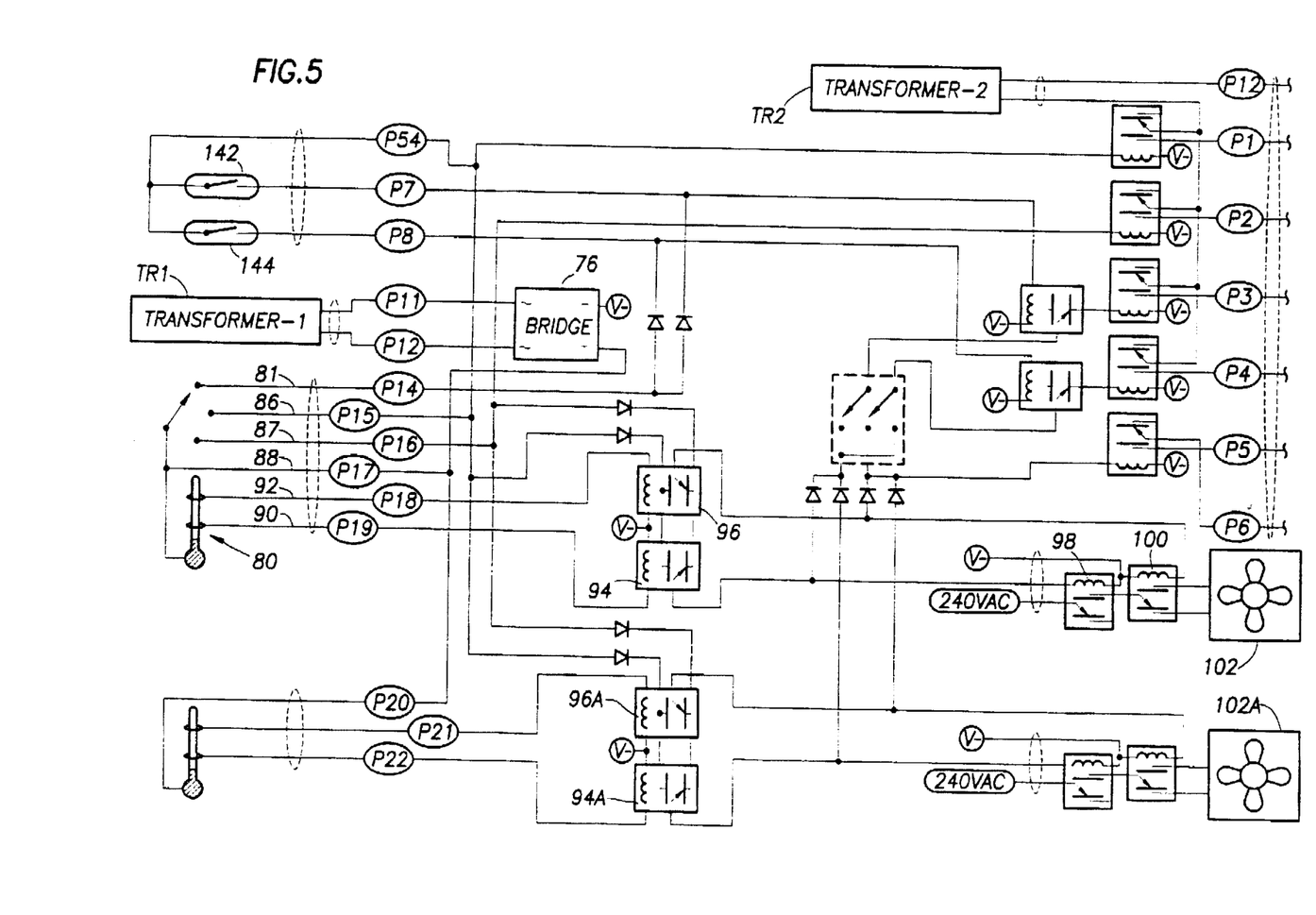
FIG. 5 is an electric schematic illustration further illustrating the control circuitry and two of the zone blower control circuits of the circuit board schematic illustrations of FIGS. 3 and 4.

Referring now to the schematic circuit board electronic circuitry illustrations of FIGS. 3 and 4, representing respectively, the "cool" and "heat" modes of electronic circuit operation, the electronic circuitry shown generally at 70 is provided with 24 volt ac voltage from a control circuit transformer 72 which receives its electrical current from a supply of 240 volt ac line voltage. The 24 volt ac control circuit operating voltage is conducted across a fuse 74 to a bridge circuit 76 which provides a 24 volt dc voltage to a control circuit and thermostat supply conductor 78 to provide a power supply to a main or primary thermostat 80 having a common conductor 82. The main thermostat 80 is located within one of the thermal zones of the dwelling or building as shown in FIG. 1, typically the thermal zone that is most accessible to the user, and provides temperature related control signals and mode control signals, such as "cool" and "heat" circuit mode settings to its associated blower and heat pump control circuit shown generally at 84. The main thermostat is provided with various control leads, including "cool" and "heat" mode control leads 86 and 87, thermostat power supply lead 88, blower control lead 89 and low and high temperature leads 90 and 92. The thermostat is provided with a temperature sensor such as a thermometer 91 having an electrically conducting thermometer base 93 which is interconnected with the common conductor 82. As the sensed temperature increases, conducting material within the thermometer tube, such as mercury, for example, will first complete an electrical circuit with the low speed blower control conductor 90 and as the temperature increases further will complete electrical circuits with both of the low and high speed blower control conductors 90 and 92. The low and high temperature leads 90 and 92 are coupled respectively with control circuit conductors which are completed across relays 94 and 96 to selectively energize the low and high speed blower coils 98 and 100 for controlling the speed of the thermal zone blower 102 responsive to the temperature that is sensed within the thermal zone within which the thermostat 80 is located. During normal heat load within the thermal zone the low range sensor of the thermostat provides a control signal via conductor 90 which, by virtue of the operational settings of the relays 94 and 96, energizes the low range coil 98 and deenergizes the high range coil 100 of blower 1, thus operating the blower 102 at its low speed setting. Energization of the low speed blower conductor 90 energizes the coil or relay 94 and closes relay contact 108 and provide 24 volt dc current from blower control conductor 86 or 87 depending upon the selected mode of the thermostat 80 to the low speed conductor for energization of the blower coil 98. Each of the other thermostat circuits is similarly electronically arranged. When the thermostat is set for its "cool" mode and the temperature within the thermal zone of thermostat 80 rises because the heat load is sufficient to overcome low range cooling the conductor 92 will be energized by the thermostat sensor, thus providing high range control signals to the relay 96 for energization of the high range blower coil 100 to increase the operating speed of the blower and provide an increased velocity flow of air from the conditioned air distribution chamber 24 to the particular thermal zone to which the zone supply blower is connected for air supply thereto.

In addition to the blower control circuitry 84 the system circuitry is provided with other blower control circuits as shown generally at 84A, 84B, 84C and 84D each having electrical connection with respective supply and control leads of thermostats 80A, 80B, 80C and 80D, which are located within respective thermal zones of the building. These thermostat controlled blower control circuits are interconnected with the heat pump system control circuitry and operate independently depending upon the thermal load of the thermal zone for which they are provided to accomplish independent operation of the respective thermal zone blowers 102A, 102B, 102C or 102D. The heat pump system control circuitry as shown in FIGS. 3 and 4, includes five independently controlled blower control circuits each controlling a blower for one of five different thermal zones within the building. It should be born in mind that the heat pump system control circuitry may be provided with any desirable number of blower control circuits, depending upon the number of thermal zones of the building that is to be heated or cooled by the heat pump system.

As mentioned above, heat pump units 1 and 2, which are installed externally of the building space to be heated and cooled, are coupled with the control circuitry and are operated in cascade fashion to provide the interior cooling and heating that required for the various thermal zones of the building space. Under normal conditions only one of the heat pumps will be operating to accommodate the thermal load, heating or cooling, that is being collectively experienced by the thermal zones of the building. Except when the thermal load being experienced is nil, one of the heat pumps, the one designated and the primary heat pump, will be operating. It will operate somewhat continuously, seldom cycling off unless minimal thermal load is being experienced. When the thermal load, heating or cooling, exceeds a predetermined load level, as determined by the control signal of the primary heat pump control thermostat 80 or the other thermostats and blower/heat pump control circuits 84A–D, the secondary heat pump will be energized along with the primary heat pump, thus causing both of the heat exchange coils 62 and 64 to be receiving flowing refrigerant from the respective heat pump compressor. The return air from the blower 60 will be thermally conditioned, heated or cooled, by the heat exchange of both of the heat exchange coils, thereby doubling the thermal capacity of the cascade heat pump system.

It should be borne in mind that either of the heat pumps 1 or 2 may be designated the primary heat pump for the purposed of balancing the operational wear of the heat pumps. This is accomplished by the "heat" and "cool" mode settings of the primary thermostat. In the heat mode, one of the heat pumps will be designated as the primary heat pump and will operate substantially continuously, with the other heat pump operating only when the thermal load reaches its predetermined level. In this mode the primary heat pump will experience operational wear at a rate greater than that of the secondary heat pump. When the mode switch of the primary thermostat is changed from "cool" to "heat" or vice versa the control circuitry will switch the primary heat pump to its secondary mode and will switch the secondary heat pump to its primary mode. This primary, secondary heat pump reversal will maintain the operational wear of both of the heat pumps at about the same rate of wear.

For heat pump operational control, with the primary thermostat 80 set in its "cool" mode as shown in FIG. 3, heat pump 1 will be designated as the primary heat pump. Since the thermostat contacts 104 and 105 are selectively closed by positioning of the "heat"-"cool" mode selector switch of the thermostat. With the "cool" contact 104 closed, the control conductor 110 will be energized across a diode 106. At this point the coil of relay 94 will be energized, closing the contact 108 and providing control current to conductor 111 across diode a 112. the contact of deenergized relay 96 will be open, thus preventing an operational control signal from reaching the secondary heat pump 2, so that only the primary heat pump 1 will be operating as long as a temperature signal is being provided only to the low temperature conductor 90 by the thermostat 80. The heat pump control conductor 111 completes its route across the circuitry and normally closed contacts of a reversing relay 114 and a heat pump control relay 115 across the normally closed contact of heat pump control relay 116 for coil activation of relay 118. When the coil of heat pump power relay 118 is energized 24 volt ac current from a second transformer TR2 is provided to a heat pump power conductor 120 via a second fuse 121 for heat pump power activation depending upon the signals of the low and high thermostat conductors 90 and 92. Since the coil of relay 118 is activated under this circumstance 24 volt ac heat pump operating current is completed across normally open contacts of heat pump control relays 118 thus closing the power contacts of the compressor motor 122 of heat pump 1 so that the motor is energized by a 240 volt ac power source S. The secondary heat pump 2 remains inactive as long as the heat load in all of the thermal zones of the building space can be efficiently accommodated by the heat load capacity of the primary heat pump.

When the thermal load in any of the thermal zones of the building increases to a predetermined value the high thermal load signal conductor 92 of the thermostat for that particular thermal zone will be energized thus energizing the coil of control relay 96 and causing closure of relay contact 123 to provide 24 volt dc control current across a diode 124 to energize the control conductor 125. Since the coils of relays 126, 127 and 128 will be energized, 24 volt ac control voltage will be provided in motor control conductor 129 thus energizing the heat pump motor control relay for contact closure to provide power to the heat pump motor 130 from the 240 volt ac power source S. Both heat pump units 1 and 2 will be operating simultaneously in this case for refrigerant flow through both of the heat transfer coils 62 and 64 and the heated or cooled air as the case may be will be conducted to the thermal zone or zones for which the high range thermal condition is being sensed.

At this time the high speed coil 100 of the blower control circuitry will be energized so that the blower 102 will be operating at its maximum capacity. When the high range blower coil is energized, the low range coil 98 will be deenergized as indicated above. Each of the zone blower control circuits 84A, 84B and 84C will be energized or deenergized at this time depending upon the particular heat load that is being sensed by the zone control thermostat thereof. It is possible, because of the demand controlled operational characteristics of the cascade heat pump system of this invention for both heat pumps to be operating and for only one of the zone control blowers to be operating at the high rang blower speed to provide the combined capacity of both heat pumps to a single thermal zone is the building space. This of course would be a rare occurrence. Further, when operating, the zone blower for each of the respective zones will be operating at either its high or low speed or will be deenergized depending upon the temperature being sensed by its thermostat. The temperature being sensed within each of the thermal zones will therefore determine whether the blower for that zone is operating or whether it is operating at its low or high speed range. If any of the blowers are operating at the high speed range thereof then the secondary heat pump will also be operating simultaneously with the primary heat pump to accommodate the heat load that is being sensed. High range blower operation and secondary heat pump operation will be terminated as soon as the temperature or thermal load being sensed within all of the thermal zones is sufficient for activation of the low range thermostat control circuit 90 only. If the thermal load in each of the thermal zones is below the minimum for energization of the low range thermostat control circuit 90 then both of the heat pumps and all of the zone responsive blowers will be deenergized.

As mentioned above, moving the thermostat mode switch from "cool" to "heat" or vice versa achieves reversal of the "primary" and "secondary" designations of the heat pumps 1 and 2. When the thermostat mode switch is at its "cool" setting, such as it would be during the Summer months for cooling the air within the building, heat pump 1 will be the primary heat pump and heat pump 2 will be the secondary heat pump. During the Winter months of the year the primary thermostat will likely be switched to the "heat" mode. Switching of the thermostat in this manner will accomplish reversal of the heat pumps 1 and 2 so that the primary heat pump 1 will become the secondary heat pump and the secondary heat pump 2 will become the primary heat pump. Thus the operational wear of heat pumps 1 and 2 will be substantially the same as each year of use of the dual, cascade arranged heat pump system is completed.

When the main thermostat is switched to the "heat" mode a heat selector contact 132 is closed and contact 104 is opened. The thermostat control current, 24 volt dc, is then conducted across a diode 134 and the closed contacts or relay 94 or the closed contacts of relay 96, depending upon the thermal load being sensed by the thermostats. The control current will then be conducted across diode 124 and conductor 125 to the reversing relay 114 for closure of the coils of relays 126 and 127 for supply of 24 volt ac heat pump control current to a heat pump motor control conductor 136 and relay 130. Thus for low range thermal load only heat pump 2 will be operating to accommodate the collective thermal load of the various thermal zones of the building space.

In the event the heat exchange coils of the cascade heat pump system should begin to freeze up for any reason it becomes necessary to shut the heat pump system down for a sufficient period of time that the ice build-up can melt or otherwise dissipate. To provide the dual cascade heat pump system with this capability automatically, freeze control circuits 138 and 140 are provide for the respective heat pump units, with each of the freeze control circuits having a freezestat 142 and 144 respectively. When a predetermined temperature is sensed by either of the freezestats, such as a temperature of 45 degrees F. for example, the contact of the freezestat will open, thus deenergizing the coil circuit for a respective relay, such as relay 126 and relay 116, thus opening the relay contacts and deenergizing the heat pump power control relays and deenergizing the respective heat pump motor to shut down the heat pump. When the low temperature condition has dissipated the increased temperature will close the respective freezestat thus again completing the circuits to the relay coils to again provide control current and operational power to the heat pump motors.

As is typically the case the evaporator heat exchange coils of the heat pumps 1 and 2 will be provided with a resistance heat strip to provide additional heat when the thermal load requires supplemental heat to maintain a selected temperature range within the various thermal zones of the building space. With the thermostat mode switch in the "heat" mode setting a heat strip circuit 146 is provided which is energized under conditions that are controlled by the thermostats of the building space. The heat from the heat strip is liberated within the air distribution chamber 24 by heating of the air to be distributed to the respective thermal zones upon demand.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A thermal zone demand controlled dual cascade arranged heat pump system and system controller for heating and cooling the air of building spaces having a plurality of thermal zones, comprising:

(a) an air circulation system for circulating air to and from said thermal zones and having a conditioned air chamber and a plurality of air supply conduits each for connection in air supplying relation with a respective one of said thermal zones of said building space;

(b) first and second heat pumps being located externally of said building space and having first and second heat exchange refrigerant coils located in series within said air circulation system therein being connected in refrigerant circulating relation respectively with said first and second heat pumps and selectively heating and cooling air flowing to said conditioned air chamber;

(c) a plurality of thermal zone blowers being connected in said air circulation system and in air supplying relation with respective air supply conduits for conducting conditioned air from said conditioned air chamber through respective air supply conduits to respective thermal zones of said building space; and (d) electronic controller circuitry being coupled for thermal demand control of said first and second heat pumps and said plurality of thermal zone blowers for operation of said first heat pump to accommodate a predetermined range of thermal load and for operation of said second heat pump to accommodate a range of thermal load in excess of said predetermined range of thermal load and for selective operation of said plurality of thermal zone blowers and when operating for selective operation of said thermal zone blowers at low blower speed and high blower speed responsive to sensed conditions of thermal load.

2. The thermal zone demand controlled dual cascade arranged heat pump system and system controller of claim 1, wherein said air circulation system comprises:

(a) housing means defining an air return chamber and a conditioned air chamber, said first and second heat exchange refrigerant coils collectively defining an air flow and conditioning partition through which return air flows from said air return chamber to said conditioned air chamber and accomplishing heat transfer to or from refrigerant being caused to flow through either of said heat exchange refrigerant coils by said first and second heat pumps;

(b) a return air plenum for receiving return air from said thermal zones;

(c) a return air blower being connected to said housing means and forcing return air from said return air plenum into said return air chamber and through said first and second heat exchange refrigerant coils; and (d) said plurality of thermal zone blowers being connected to said housing means and having respective electric motors being independently operable by said electronic control circuitry and being arranged for independent supply of conditioned air from said conditioned air chamber through respective air supply conduits to respective thermal zones.

3. The thermal zone demand controlled dual cascade arranged heat pump system and system controller of claim 2, wherein:

filter means being located within said air return plenum for filtering return air flowing from said return air plenum to said return air blower.

4. The thermal zone demand controlled dual cascade arranged heat pump system and system controller of claim 1, wherein said electronic controller circuitry comprises:

(a) a dc control power supply circuit and an ac control power supply circuit;

(b) a plurality of zone blower circuits each being operationally connected to respective thermal zone blowers for control by said dc control power supply circuit, each of said zone blower circuits having a high speed coil for controlling high speed blower operation and having a low speed coil for controlling low speed zone blower operation;

(d) a plurality of thermostats each being located within a respective thermal zone of said building space, one of said thermostats being a main thermostat and the other of said thermostats being secondary thermostats, each of said thermostats being electronically connected with said dc control power supply of said electronic controller circuitry and having respective low and high temperature signal conductors being energized at respective low and high predetermined temperatures; and (e) a high range control relay and a low range control relay being provided for each of said thermal zone blower circuits and having the coils thereof connected respectively to said low temperature and high temperature conductors of the respective thermostat for selective temperature responsive energization.

5. The thermal zone demand controlled dual cascade arranged heat pump system and system controller of claim 4, wherein:

(a) said plurality of thermostats each having a mode selector switch having a "cool" position for air conditioning by said heat pumps, a "heat" position for heating by said heat pumps and an "off" position for deenergizing said heat pump system; and (b) a "cool" selector circuit and a "heat" selector circuit being provided in each of said plurality of thermostats, said "cool" and "heat" selector circuits each having circuit contacts being selectively closed by said mode selector switch, energization of said "cool" selector circuit designating said first heat pump as primary for selected temperature range controlled operation thereof and said second heat pump as secondary for operation thereof simultaneously with said primary heat pump, energization of said "heat" selector circuit designating said second heat pump as primary for selected temperature range controlled operation and designating said first heat pump as secondary for operation thereof simultaneously with said primary heat pump at a second selected temperature range.

6. The thermal zone demand controlled dual cascade arranged heat pump system and system controller of claim 5, wherein:

(a) said heat pumps each having a power supply and having a power control relay for selectively connecting said heat pump power supply with the compressor motor thereof;

(b) a plurality of heat pump operational relays each having activation coils and having heat pump power control conductors connected to said power control relays of respective first and second heat pumps for operation thereof and further having relay switched contacts for said power control conductors; and (c) said activation coils of said heat pump operational relays being selectively energized responsive to temperature control signals of either of said thermostats and selective positioning of said mode selector switches of said thermostats.

7. The thermal zone demand controlled dual cascade arranged heat pump system and system controller of claim 5, wherein said electronic controller circuitry further comprises:

(a) a plurality of heat pump control relays each having an operational coil connected for selective energization by said dc power supply and having power circuits being connected with said ac power supply and power control connections being selectively energized by said ac power supply for control power supply to respective heat pumps upon dc current energization of the operational coil thereof; and (b) a reversing relay having first and second dc power supply circuits being selectively energized by completion of said "cool" selector circuit and said "heat" selector circuit, said first dc power supply circuit being connected to the coil of the power control relay for heat pump 1 and said second dc power supply circuit being connected to the coil of the power control relay for heat pump 2 for selection of either of said heat pumps 1 and 2 as the primary or secondary heat pump responsive to selective completion of said "cool" and "heat" selector circuits.

8. The thermal zone demand controlled dual cascade arranged heat pump system and system controller of claim 1, further comprising:

a plurality of thermostats being located within respective thermal zones, each of said thermostats comprising:

(a) a thermostat power supply conductor being connected with said controller power supply;

(b) a temperature sensor having an electric power base connected to said thermostat power supply conductor and having electrical connections reflecting low blower speed and high blower speed and further having means for completing an electrical circuit between said electric power base and said low and high blower speed electrical connections responsive to the sensing of predetermined low and high temperatures; and (c) a low temperature electrical relay and a high temperature electrical relay being selectively energized by said controller power supply responsive to temperature in the respective thermal zone sensed by said temperature sensor of said thermostat for selectively controlling energization of said low speed and high speed coils of said thermal zone blower by said controller power supply.

9. A thermal zone demand controlled dual cascade arranged heat pump system and system controller for building spaces, comprising:

(a) a pair of heat pumps being located externally of the building space;

(b) a plurality of thermostats each being located within a respective one of said thermal zones for sensing the temperature of air therein, said thermostats each having low speed and high speed blower control circuits each becoming electrically energized at a predetermined temperature range, one of said thermostats being a main thermostat and having a mode selector switch for selection of a "cool" mode, a "heat" mode and an "off" mode;

(c) a conditioned air supply and return assembly having a conditioned air chamber, an air return plenum and a plurality of air supply conduits for conducting conditioned air from said conditioned air chamber to respective thermal zones;

(d) a plurality of thermal zone air supply blowers each being situate for moving conditioned air from said conditioned air chamber through respective air supply conduits to respective thermal zones and each having low speed and high speed operating coils;

(e) a pair of heat transfer refrigerant coils being interconnected respectively with said pair of heat pumps and being located in series within said conditioned air chamber upstream of said air supply conduits;

(f) an air return blower being located within said conditioned air chamber and forcing air from said air return plenum into said conditioned air chamber; and (g) electronic heat pump and blower control circuitry being conditionable to select one of said heat pumps as the primary heat pump for operation to accommodate a predetermined thermal load and to select the other of said heat pumps as the secondary heat pump for operation simultaneously with said primary heat pump to accommodate thermal load in excess of said predetermined thermal load, said electronic heat pump and blower control circuitry also being conditionable for reversing said primary and secondary selection of said pair of heat pumps, said electronic heat pump and blower control circuitry further having a plurality of zone control circuits each being electronically coupled with one of said plurality of thermostats for thermal zone and thermal load controlled zone blower and heat pump control signals.

10. The thermal zone demand controlled dual cascade arranged heat pump system and system controller of claim 9, wherein said plurality of thermostats each comprise:

(a) a mode selector switch having a "cool" position for air conditioning by said heat pumps, a "heat" position for heating by said heat pumps and an "off" position for deenergizing said heat pump system; and (b) a "cool" selector circuit and a "heat" selector circuit being provided in each of said plurality of thermostats, said "cool" and "heat" selector circuits each having circuit contacts being selectively closed by said mode selector switch, energization of said "cool" selector circuit designating said first heat pump as primary for selected temperature range controlled operation thereof and said second heat pump as secondary for operation thereof simultaneously with said primary heat pump, energization of said "heat" selector circuit designating said second heat pump as primary for selected temperature range controlled operation and designating said first heat pump as secondary for operation thereof simultaneously with said primary heat pump at a second selected temperature range.

11. The thermal zone demand controlled dual cascade arranged heat pump system and system controller of claim 10, said heat pumps each having compressor motors and wherein:

(a) said heat pumps each having an ac operating power supply and having a power control relay for selectively connecting said heat pump ac operating power supply with the compressor motor thereof;

(b) a plurality of heat pump operational relays each having activation coils and having heat pump power control conductors connected to said power control relays of respective first and second heat pumps for operation thereof and further having relay switched contacts for said power control conductors; and (c) said activation coils of said heat pump operational relays being selectively energized responsive to temperature control signals of either of said thermostats and selective positioning of said mode selector switches of said thermostats.

12. The thermal zone demand controlled dual cascade arranged heat pump system and system controller of claim 9, wherein said electronic heat pump and blower control circuitry further comprises:

(a) a plurality of heat pump control relays each having an operational coil connected for selective energization by said dc power supply and having power circuits being connected with said ac power supply and power control connections being selectively energized by said ac power supply for control power supply to respective heat pumps upon dc current energization of the operational coil thereof; and (b) a reversing relay having first and second dc power supply circuits being selectively energized by completion of said "cool" selector circuit and said "heat" selector circuit, said first dc power supply circuit being connected to the coil of the power control relay for heat pump 1 and said second dc power supply circuit being connected to the coil of the power control relay for heat pump 2 for selection of either of said heat pumps 1 and 2 as the primary or secondary heat pump responsive to selective completion of said "cool" and "heat" selector circuits.

13. The thermal zone demand controlled dual cascade arranged heat pump system and system controller of claim 9, wherein said plurality of thermostats comprise:

(a) a thermostat power supply conductor being connected with said controller power supply;

(b) a temperature sensor having an electric power base connected to said thermostat power supply conductor and having electrical connections reflecting low blower speed and high blower speed and further having means for completing an electrical circuit between said electric power base and said low and high blower speed electrical connections responsive to the sensing of predetermined low and high temperatures; and (c) a low temperature electrical relay and a high temperature electrical relay being selectively energized by said controller power supply responsive to temperature in the respective thermal zone sensed by said temperature sensor of said thermostat for selectively controlling energization of said low speed and high speed coils of said thermal zone blower by said controller power supply.

14. The thermal zone demand controlled dual cascade arranged heat pump system and system controller of claim 9, wherein said plurality of thermostats each comprise:

(a) a controller power supply;

(b) a temperature sensor having an electric power base and having electrical connections reflecting low blower speed and high blower speed and further having means for completing an electrical circuit between said electric power base and said low and high blower speed electrical connections responsive to the sensing of predetermined temperatures;

(c) a power supply conductor having connection with said electric power base and providing electric power supply thereto from said controller power supply; and (d) a pair of electrical relays being selectively energized by said controller power supply for selectively controlling energization of said low speed and high speed coils of said thermal zone blower by said controller power supply for the thermal zone of said thermostat.

\* \* \* \* \*